United States Patent [19]

Moody

[11] Patent Number: 4,774,537
[45] Date of Patent: Sep. 27, 1988

[54] IRIS OR SHUTTER ARRANGEMENTS

[75] Inventor: Michael H. Moody, Chelmsford, United Kingdom

[73] Assignee: English Electric Valve Company Limited, Chelmsford, England

[21] Appl. No.: 867,575

[22] Filed: May 28, 1986

[30] Foreign Application Priority Data

May 30, 1985 [GB] United Kingdom ............... 8513689

[51] Int. Cl.$^4$ .............................................. G03B 9/04
[52] U.S. Cl. ................................. 354/229; 354/271.1
[58] Field of Search .................... 354/227.1, 228, 441, 354/453, 446, 231, 229

[56] References Cited

U.S. PATENT DOCUMENTS 3,986,022 10/1976 Hyatt .......................... 354/227.1 X
4,313,663 2/1982 Stemme et al. ................. 354/271.1
4,478,502 10/1984 Nakai ............................. 354/453 X

FOREIGN PATENT DOCUMENTS 894337 9/1982 France .
2428012 1/1976 Fed. Rep. of Germany .
2620173 11/1977 Fed. Rep. of Germany .
2816851 10/1979 Fed. Rep. of Germany .
2830293 1/1980 Fed. Rep. of Germany .
3147394 6/1983 Fed. Rep. of Germany .
1318082 5/1973 United Kingdom .
1529212 10/1978 United Kingdom .

OTHER PUBLICATIONS

Patent Abstracts of Japan, vol. 8, No. 65, p. 263, Mar. 27, 1984; Mitsumasa Moriya.

Primary Examiner—Michael L. Gellner
Assistant Examiner—Brian W. Brown
Attorney, Agent, or Firm—Spencer & Frank

[57] ABSTRACT

An iris and shutter arrangement for a camera, particularly a CCD camera, in which a first liquid crystal display is formed of a plurality of concentric annuli of liquid crystal material and a second liquid crystal display is provided as a further plurality of coaxial annuli each of which overlies the space separating one annuli from the next in the first display. The first display also includes a relatively clear central circular area, defining the smallest aperture desired, which is covered by a circular area of liquid crystal material in the second display. The annuli in both cases are continuous save for breaks along a line forming a path for control conductors deposited upon the faceplates of the two displays.

16 Claims, 2 Drawing Sheets

IRIS OR SHUTTER ARRANGEMENTS

BACKGROUND OF THE INVENTION

This invention relates to iris and shutter arrangements and in particular, though not exclusively to such arrangements for use in CCD and other electronic cameras.

Typically, iris and shutter arrangements for cameras as at present known are essentially mechanical in operation ableit possibly controlled electronically. The complexity of such mechanical iris and shutter arrangements tends to be high and one object of the present invention is to provide an improved iris and shutter arrangement which does not require mechanically moving components to achieve the essential aperture-limiting and shutter actions.

SUMMARY OF THE INVENTION

According to this invention an iris and shutter arrangement for a camera comprises a first segmented liquid crystal member and a second segmented liquid crystal member mounted consecutively in the path of incident energy, said first and second members each comprising a plurality of discrete areas in said path which may be addressed individually to change their light transmissivity to vary the effective aperture provided by the display to said incident energy and wherein said discrete areas in the second member overlie at least the boundaries between the discrete areas of said first member.

Preferably said discrete areas are provided in the form of coaxial annuli.

Preferably the innermost of said annuli in the first segmented liquid crystal member surrounds a circular area which has a fixed relatively high energy transmissivity and represents the smallest aperture required of said iris and shutter arrangement.

Commonly the radial dimensions of said annuli in the first segmented liquid crystal member will increase in an outward direction from annulus to annulus whereby a range of apertures may be obtained which is in accordance with a desired law.

Preferably each annulus is substantially complete save that in a preferred embodiment the annuli are broken along a radially extending line along which pass control electrical conductors for selectively energising said annuli of liquid crystal material.

Preferably said control electrical conductors are conductive strips formed on one faceplate of said display.

Preferably said circular central area of said first member is covered by a disc of liquid crystal material in said second member.

The liquid crystal member may be a guest/host material such that when a discrete area is energised the light transmissivity of that area changes from a relatively highly obstructive to a relatively highly passive state.

Normally said incident energy is visible light.

According to a feature of this invention a camera includes an iris and shutter arrangement substantially as described above and according to a further feature of this invention said camera is a CCD camera.

BRIEF DESCRIPTION OF THE DRAWINGS

The invention is illustrated in and further described with reference to FIGS. 1 and 2 of the accompanying drawings in which.

DESCRIPTION OF THE PREFERRED EMBODIMENT

Figure 1:
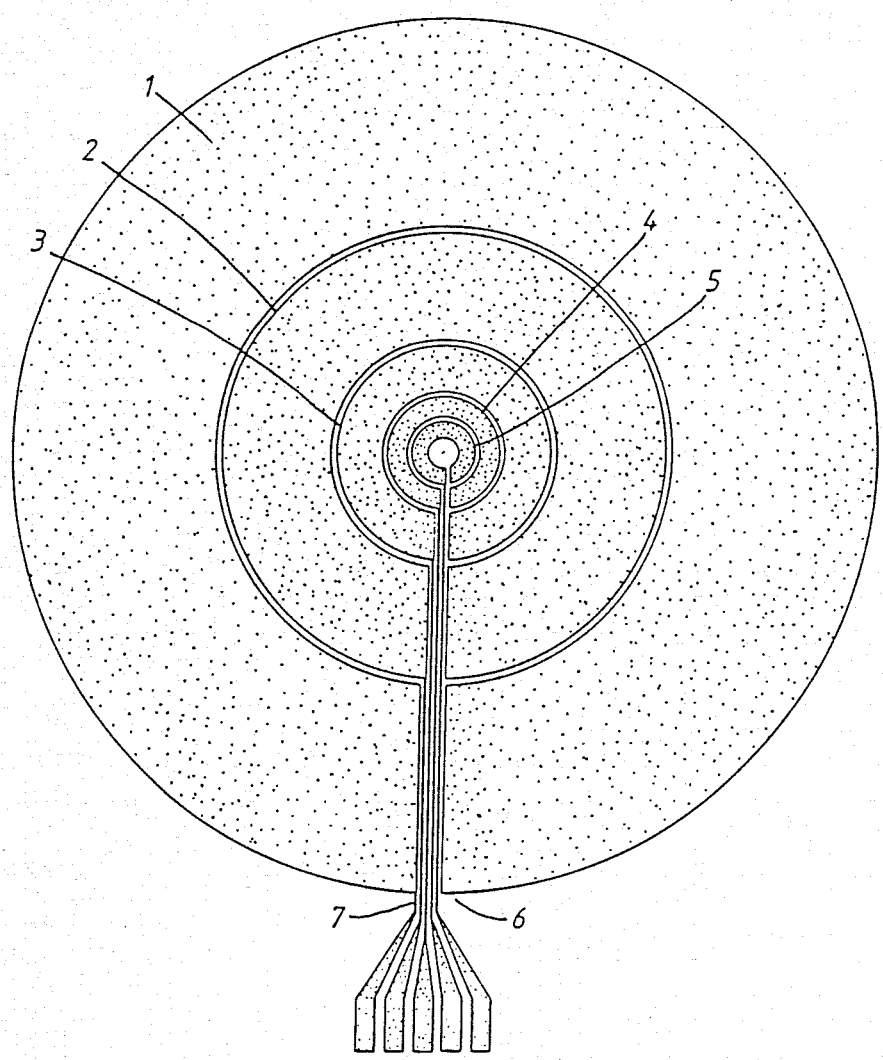
FIG. 1 is a plan view of the first segmented member and FIG. 2 is a plan view of the second segmented member display of an iris and shutter arrangement applied to a CCD camera, all in accordance with the present invention.

Referring to FIG. 1 the liquid crystal display forming said first segmented liquid crystal member comprises five coaxial annuli 1 to 5 which are complete (i.e. continuous) except along a radially extending line 6. The breaks in said annuli 1 to 5 along the line 6 form a path through which electrical conductors 7 are passed to control the energisation of the liquid crystal material in each of the annuli 1 to 5.

It will be noted that the radial dimension of each of the annuli 1 to 5 is not the same. In this particular case the dimensions are chosen to provide conventional increases, or decreases, of aperture as conventionally found in photography.

The clear circular area surrounded by the innermost annulus 5 represents the smallest required aperture of course.

Figure 2:
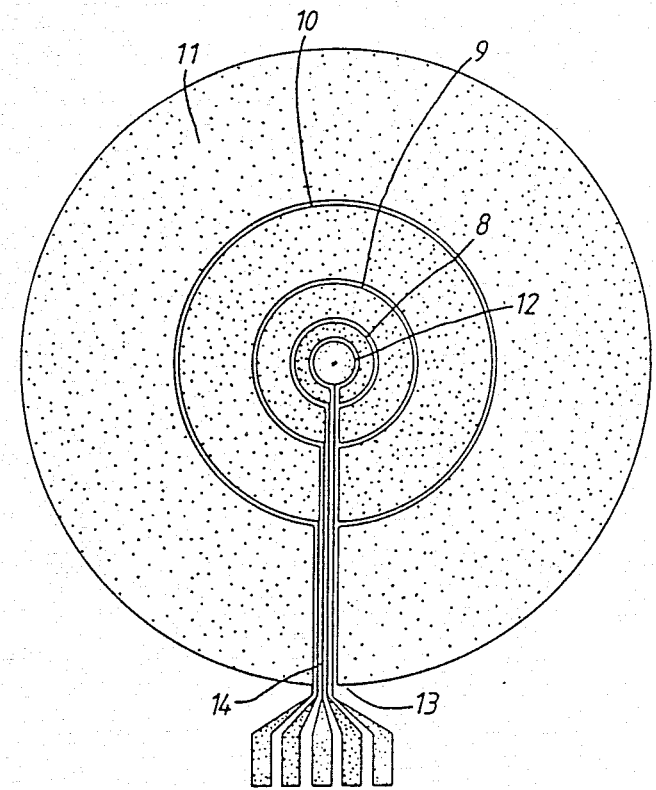

Referring to FIG. 2, the second segmented liquid crystal member shown therein should be taken concentrically to overlie the first segmented liquid crystal member illustrated in FIG. 1. As will be seen, this comprises a concentric series of annuli 8 to 11 of liquid crystal material each annulus overlying, inter alia, the unobstructed annular areas separating the annuli 1 to 5 of liquid crystal material forming the first segmented member of FIG. 1. In addition, the second segmented member of FIG. 2 includes a central disc 12, surrounded by the innermost annulus 8 which covers the relatively unobstructed area (of fixed relatively high transmissivity) surrounded by the innermost annulus 5 of FIG. 1.

Again, the annuli 8 to 11 of FIG. 2 are broken along a line 13 to form a path along which controlling electrical conductors 14 are passed.

In both the first segmented member of FIG. 1 and the second segmented member of FIG. 2, the liquid crystal material within the different annuli is a guest/host material (without polarisers). Thus, when energised the different annuli change from a state of relatively complete obstruction to light to a state of relatively high light transmissivity. Thus, by suitably applying control signals to the leads 7 and 14 a combined iris and shutter effect may be achieved depending upon the requirements at the particular time. For example, to increase the size of the aperture through the whole range of sizes from the smallest to the largest, annuli from the two liquid crystal members would be energised substantially and held in that state once energised until the aperture was required to be reduced once more. For shuttering, any energised annuli would be de-energised together. By simple control the sequence of annuli energised before shuttering may be energised together when shuttering is to cease so that the aperture is restored to size immediately before shuttering.

The conductors 7 and 14 (together with any desired connecting pads as shown) are conveniently provided by deposited conductors formed upon one of the faceplates of the respective displays. Whilst not illustrated, the conductors may of course be discrete wired conductors or separate light transmissive plates may be provided whose principle purpose is to carry the control conductors, in which case the annuli 1 to 5 of the first member and the annuli 8 and 11 of the second member may be completely continuous.

I claim:

1. An iris and shutter arrangement for a camera comprising a first segmented liquid crystal member and a second segmented liquid crystal member mounted consecutively in the path of incident energy, said first and second members each comprising a plurality of discrete areas in said path which may be addressed individually to the change their light transmissivity to vary the effective aperture provided by the first and second members to incident energy and wherein said discrete areas in the second member overlie at least the boundaries between the discrete areas of said first member.

2. An arrangement as claimed in claim 1 and wherein said discrete areas are provided in the form of coaxial annuli.

3. An arrangement as claimed in claim 2 and wherein the innermost of said annuli in the first segmented liquid crystal member surrounds a circular area which has a relatively high energy transmissivity and represents the smallest aperture required of said iris and shutter arrangement.

4. An arrangement as claimed in claim 2 and wherein the radial dimensions of said annuli in the first member increase in an outward direction from annulus to annulus whereby a range of apertures may be obtained which is in accordance with a desired law.

5. An arrangement as claimed in claim 2 and wherein each annulus is substantially complete.

6. An arrangement as claimed in claim 5 and wherein each annulus is substantially complete save that the annuli are broken along a radially extending line along which pass control electrical conductors for selectively energising said annuli of liquid crystal material.

7. An arrangement as claimed in claim 6 and wherein said control electrical conductors are conductive strips formed on one faceplate of said first and second members.

8. An arrangement as claimed in claim 3 and wherein said circular area of said first member is covered by a disc of liquid crystal material in said second member.

9. An arrangement as claimed in claim 1 and wherein said liquid crystal material is guest/host material such that when a discrete area is energised the light transmissivity of that area changes from a relatively highly obstructive to a relatively highly passive state.

10. An arrangement as claimed in claim 1 and wherein the incident energy is visible light.

11. An iris and shutter arrangement for a camera, comprising:

a first segmented liquid crystal member and a second segmented liquid crystal member, mounted consecutively in the path of incident energy, said first member including a plurality of discrete first areas in said path successively surrounding one another along respective first boundaries therebetween, said second member including a plurality of second areas in said path successively surrounding one another along respective second boundaries therebetween, each successive one of said first boundaries being completely overlaid by a respective successive one of said second areas, each of said first and second areas being individually addressable to change their light transmissivity to vary the effective aperture provided by said first and second members to the incident energy.

12. An arrangement as claimed in claim 11, further comprising means for addressing each of said first and second areas individually to change their transmissivity to the incident energy.

13. An arrangement as in claim 12, wherein said first and second areas are coaxial annuli.

14. An arrangement as in claim 13, wherein the innermost one of said first areas is an annular area surrounding a circular area having a fixed relatively high energy transmissivity and represents the smallest aperture required of the iris and shutter arrangement.

15. An arrangement as in claim 11, wherein said first and second areas are coaxial annuli.

16. An arrangement as in claim 15, wherein the innermost one of said first areas is an annular area surrounding a circular area having a fixed relatively high energy transmissivity and represents the smallest aperture required of the iris and shutter arrangement.

* * * * *